(12) United States Patent
Needleman (10) Patent No.: US 9,773,162 B2
(45) Date of Patent: Sep. 26, 2017

(54) USER DISCOVERY VIA DIGITAL ID AND FACE RECOGNITION

(71) Applicant: Evernote Corporation, Redwood City, CA (US)

(72) Inventor: Rafe Needleman, San Francisco, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 0 days.

(21) Appl. No.: 14/564,709

(22) Filed: Dec. 9, 2014

(65) Prior Publication Data

US 2015/0169946 A1    Jun. 18, 2015

Related U.S. Application Data

(60) Provisional application No. 61/914,994, filed on Dec. 12, 2013.

(51) Int. Cl.
*G06K 9/00* (2006.01)
*G06F 17/30* (2006.01)

(52) U.S. Cl.
CPC ... *G06K 9/00295* (2013.01); *G06F 17/30247* (2013.01); *G06K 9/00255* (2013.01); *G06K 9/00261* (2013.01); *G06K 9/00671* (2013.01)

(58) Field of Classification Search
None
See application file for complete search history.

(56) References Cited

U.S. PATENT DOCUMENTS

| 8,422,747 B1 * | 4/2013 | Leung | H04L 51/32 |
| | | | 382/118 |
| 8,560,625 B1 * | 10/2013 | Hardman | G06K 9/00677 |
| | | | 382/118 |
| 2008/0250066 A1 | 10/2008 | Ekstrand et al. | |

(Continued)

FOREIGN PATENT DOCUMENTS

WO    WO 2013/078075 A1    5/2013

OTHER PUBLICATIONS

Evernote, International Search Report and Written Opinion, PCT/US2014/069297, Mar. 11, 2015, 7 pgs.

(Continued)

*Primary Examiner* — Ryan P Potts
(74) *Attorney, Agent, or Firm* — Morgan, Lewis & Bockius LLP (57) ABSTRACT

Accumulating contact information of a member of a group of participants includes determining contact information that includes facial image information for each of a set of participants that are in close physical proximity to a user, where the set of participants is a subset of potential participants that include people that are not in close proximity to the user. The user obtains a facial image of the member. The facial image of the member is compared to facial images of the set of participants. In response to matching the facial image of the member to a facial image of a particular one of the set of participants, contact information is requested for the particular one of the set of participants to be added to contact information maintained by the user and/or a contact management system accessible by multiple users.

24 Claims, 5 Drawing Sheets

(56) References Cited

U.S. PATENT DOCUMENTS

| | | | |
|---|---|---|---|
| 2010/0287053 A1* | 11/2010 | Ganong | G06F 17/30247 |
| | | | 705/14.66 |
| 2011/0047478 A1* | 2/2011 | Ellsworth | G06F 9/543 |
| | | | 715/747 |
| 2011/0066743 A1* | 3/2011 | Hurley | H04W 4/02 |
| | | | 709/231 |
| 2012/0215849 A1* | 8/2012 | Shekhawat | G06Q 50/01 |
| | | | 709/204 |
| 2013/0121540 A1 | 5/2013 | Garcia et al. | |
| 2013/0136298 A1 | 5/2013 | Yu et al. | |
| 2013/0329969 A1* | 12/2013 | Greenberg | G06F 17/30265 |
| | | | 382/118 |
| 2014/0328521 A1* | 11/2014 | Colangelo | H04L 67/18 |
| | | | 382/118 |
| 2014/0330729 A1* | 11/2014 | Colangelo | G06Q 20/40145 |
| | | | 705/72 |
| 2015/0074206 A1* | 3/2015 | Baldwin | H04L 51/10 |
| | | | 709/206 |

OTHER PUBLICATIONS

Evernote, International Preliminary Report on Patentability, PCT/US2014/069297, Jun. 14, 2016, 6 pgs.

* cited by examiner

USER DISCOVERY VIA DIGITAL ID AND FACE RECOGNITION

CROSS-REFERENCE TO RELATED APPLICATIONS

This application claims priority to U.S. Prov. App. No. 61/914,994, filed Dec. 12, 2013, and entitled "USER IDENTIFICATION VIA DIGITAL ID AND FACE RECOGNITION", which is incorporated herein by reference.

TECHNICAL FIELD

This application is directed to the field of information management and communications, especially in conjunction with extracting and presenting cloud based contact records for user identification utilizing facial recognition.

BACKGROUND OF THE INVENTION

Modern lifestyle is undergoing one of the most fundamental changes in decades, thanks to quick emergence of a mobile computing paradigm. According to market statistics, smartphones and tablets have outsold personal computers for the first time in the fourth quarter of 2011. In the fourth quarter of 2014, unit shipment volumes of tablets alone are expected to exceed cumulative personal and business PC shipments, while by 2017, several forecasts anticipate about 87% of market share of smart connected devices to be smartphones and tablets and only 13% desktop and mobile PCs.

In response to growing volumes and expanding hardware capabilities and feature sets of smartphones and tablets, a new generation of mobile software applications utilizes enhanced connectivity of smartphones and takes advantage of their interaction with cloud services and client side computing power. Voice recognition, automatic question answering and other natural language processing technologies, using motion sensors and eye tracking for device and application control, text recognition in images, facial recognition and many more technology intense software applications, are changing the way people are using smartphones and communicating with each other and the world.

The next wave of mobile computing is broadly associated with multi-purpose and specialized mobile devices, especially wearable computers, such as smart glasses and other head-mounted cameras and displays, smart watches, wristware, etc. According to some forecasts, worldwide use of augmented reality devices, such as smart glasses, will reach 1% of the world population (over 70M units) by 2016.

Efficient techniques for identifying new contacts and capturing contact information during business and ad hoc meetings has long been viewed as one of the most prominent and challenging tasks of personal information management. Starting with basic procedures of writing down or typing each other's contact information and physical exchange of business cards, methods for capturing contact information have progressed to taking photographs of business cards or badges using smartphone cameras, followed by optical character recognition of captured images to retrieve at least partial contact information of a meeting participant (as implemented, for example, in the Page Camera feature of the EVERNOTE® cloud service and software for smartphones, developed by EVERNOTE® Corporation of Redwood City, Calif.).

With the emergence of social networks such as the LINKEDIN social network, the FACEBOOK social network or the TUMBLR social network that offer programmatic access to their databases by third parties, the next generation of contact capturing applications has evolved, exploiting a capability of automatic expansion of partial contact information obtained, for example, via a Page Camera feature, by scanning social networks, searching for the known partial people data and extracting additional details from the networks.

Other approaches employ automatic exchange of contact information between users residing in each other's proximity using various technologies: some applications may post contact information to a temporary network location so that it becomes available for an automatic retrieval by authorized users in a group; other applications use direct data transmission via NFC technologies.

While each of the above-listed automatic methods is noticeably more efficient than cataloging physical business cards or exchanging handwritten or hand-typed contact information, capturing business cards still requires multiple interactions between users and additional interaction steps by each user with a relevant smartphone software application and may run into logistical and mobility obstacles. As to direct transmission methods between new participants of a meeting, the direct transmission methods may not be sufficiently selective and may require establishing trusted connection between multiple devices, which also invites additional steps, such as exchanging pin codes typed on smartphones or other preliminary identification steps, which makes them comparable by complexity with typing in basic user information.

Recent developments in facial recognition and its growing accuracy may offer another opportunity to streamline contact identification tasks and turn contact information retrieval into a hands-free task. However, even high facial recognition accuracy does not guarantee a problem free solution when a system needs to identify a person from a large set of facial photographs, thus leading to potential accumulation of errors.

Accordingly, it is desirable to design a robust and streamlined system and workflow for retrieving contact information based on facial recognition.

SUMMARY OF THE INVENTION

According to the system described herein, accumulating contact information of a member of a group of participants includes determining contact information that includes facial image information for each of a set of participants that are in close physical proximity to a user, where the set of participants is a subset of potential participants that include people that are not in close proximity to the user, the user obtaining a facial image of the member, comparing the facial image of the member to facial images of the set of participants, and, in response to matching the facial image of the member to a facial image of a particular one of the set of participants, requesting contact information for the particular one of the set of participants to be added to contact information maintained by the user and/or a contact management system accessible by multiple users. The user may obtain a facial image of the member using one of: smart glasses, a wearable camera, and a smart phone. The potential participants may all be members of at least one organization affiliated with at least one organization to which the user belongs. At least some of the potential participants may be members of an organization affiliated with the user. The user and the potential participants may all be registered for a particular event. Facial images of the set of participants may be stored using a cloud service. The cloud service may compare the facial image of the member to facial images of the set of participants. Each of the potential participants may be assigned a unique identifier and the user may be provided with a list of unique identifiers corresponding to the set of participants that are in close physical proximity to the user. The list of unique identifiers may be modified in response to changes in the set of participants causing different ones of the participants to be in close physical proximity to the user. The user may not directly access the identifiers. Comparing the facial image of the member to facial images of the set of participants may be initiated automatically in response to the user photographing the member. Prior to comparing the facial image of the member to facial images of the set of participants, the set of participants may be further reduced according to a determination of distance in the facial image of the member to distances between the user and each of the set of participants. Accumulating contact information of a member of a group of participants may also include informing the member that contact information for the member has been added to contact information maintained by the user and/or to a contact management system accessible by multiple users. The member may determine whether to release the contact information. The member may determine an amount of the contact information to release.

According further to the system described herein, a non-transitory computer-readable medium contains software that accumulates contact information of a member of a group of participants. The software includes executable code that determines contact information that includes facial image information for each of a set of participants that are in close physical proximity to a user, where the set of participants is a subset of potential participants that include people that are not in close proximity to the user, executable code that compares a facial image of the member obtained by the user to facial images of the set of participants, and executable code that requests contact information for the particular one of the set of participants to be added to contact information maintained by the user and/or a contact management system accessible by multiple users in response to matching the facial image of the member to a facial image of a particular one of the set of participants. The user may obtain a facial image of the member using one of: smart glasses, a wearable camera, and a smart phone. The potential participants may all be members of at least one organization affiliated with at least one organization to which the user belongs. At least some of the potential participants may be members of an organization affiliated with the user. The user and the potential participants may all be registered for a particular event. Facial images of the set of participants may be stored using a cloud service. The cloud service may compare the facial image of the member to facial images of the set of participants. Each of the potential participants may be assigned a unique identifier and the user may be provided with a list of unique identifiers corresponding to the set of participants that are in close physical proximity to the user. The list of unique identifiers may be modified in response to changes in the set of participants causing different ones of the participants to be in close physical proximity to the user. The user may not directly access the identifiers. Comparing the facial image of the member to facial images of the set of participants may be initiated automatically in response to the user photographing the member. Prior to comparing the facial image of the member to facial images of the set of participants, the set of participants may be further reduced according to a determination of distance in the facial image of the member to distances between the user and each of the set of participants. The software may also include executable code that informs the member that contact information for the member has been added to contact information maintained by the user and/or to a contact management system accessible by multiple users. The member may determine whether to release the contact information. The member may determine an amount of the contact information to release.

The proposed system is based on a combination of temporary location specific digital identifiers and facial recognition from an ad hoc photograph; the system offers an accurate one-click extraction of contact information of any member of a group during a face-to-face meeting by a user employing a camera-enabled device, such as smart glasses or a smart phone.

One scenario of a system usage occurs when a group of people affiliated with an organization, event or other venues are meeting face-to-face and a group member (user) wishes to receive contact information of another member (correspondent) without disturbing the meeting or getting distracted. The system receives a photograph (or several photographs) of the correspondent made by the user, using, for example, a smart phone or an augmented reality device such as smart glasses or other wearable camera, and returns contact information of the correspondent entered into a personal information management system of the user or into a broader personal content management system, such as the EVERNOTE® service and software developed by EVERNOTE® Corporation of Redwood City, Calif., which may reside on any device, such as a smartphone, and may be cloud based. Subsequently, the contact information of the correspondent may be displayed, side-by-side with an original photograph of the correspondent, on an augmented reality display of the user and may facilitate introduction and conversation between the user and the correspondent. This seamless hands-free process (from the user standpoint) may employ significant processing on a system back-end.

In order to provide a one-click/one-touch acquisition of contact information, the proposed system is designed as a two-phase identification engine.

System components include:
(a) a cloud service maintaining contact databases of various groups of users (affiliates), such as company employees and/or employees of several partnering companies, participants of a conference, a trade show, a meet up or other event or gathering, hotel guests, etc.;
(b) client side applications for various mobile platforms and devices, such as smartphones, smart glasses and other wearable cameras and displays, capable of interacting with the cloud service;
(c) facial recognition software capable of matching and identifying users based on facial photos, predominantly running within the cloud service.
(d) a location aware software running both in the cloud and on mobile devices, maintaining spatial proximity lists of affiliates.

The cloud service operates on a subscription basis. Service subscribers may agree to share contact information with other subscribers upon system request and may designate various levels of contact details for different groups of users. For example, employees a company or partner companies may receive full contact information; participants of a professional conference may receive name, company and email; a hotel guest met in a lobby or during a breakfast may receive only a first name for introductions, etc. Notwithstanding various security levels, some organizations (such as big companies) may mandate subscription of members of the organizations to facilitate introductions in working and conference environments.

The system keeps contact information and high quality facial photographs of all affiliates in the cloud database. Photographs may be pre-processed to facilitate facial recognition; for example, original images may be supplied with facial reference points and key numeric parameters describing a configuration of the reference points.

Each affiliate may be assigned a unique personal identifier, such as a shortened URL or URI of a cloud database record or an associated web page of the affiliate.

An associated software application running on smartphones and on certain wearable devices, such as smart glasses or augmented reality cameras and displays, may be capable of retrieving and storing contact information from the cloud database. A wearable device may also upload custom photographs to the cloud service for facial recognition and may perform portions of facial recognition locally using known techniques.

The system allows an automatic creation of a list of personal identifiers on a user device, which may include all identifiers from subscriber devices that are in proximity with the user.

Such information may be transferred directly between devices without confirmation (an automatic handshake option offered in several mobile operational systems). Alternatively, the proximity group and the corresponding list of identifiers for a user device may be built in the cloud service, which tracks subscriber locations and forms proximity groups. The system may, in some cases, not allow direct user access to identifiers, such as manually retrieving contact information corresponding to the identifiers. The system may also dynamically update a list of identifiers on a device of a user as affiliates with mobile devices enter and leave a predefined proximity area. In some embodiments, the system may build the list of identifiers in response to user photographing a participant in proximity of a user, in which case the list of identifiers may be static rather than dynamic.

An identification request to the system may be initiated by a photograph of a correspondent made by a user in a camera mode of a software application of the system, provided that the proximity group on a device of a user is not empty. If the list of identifiers for the current proximity group exists in the device, the list of identifiers is uploaded to the cloud service together with the photograph. The list of personal identifiers is used in the subsequent processing, no matter whether the list was uploaded or created in the cloud service.

The system pre-processes the new photograph for facial identification (recognition) purposes. In case of success (acceptable facial view angle, lighting conditions, distance, image stability, etc.), the system transfers the photograph to the cloud service, where photographs of all affiliates from the user proximity group (i.e. from the list of personal identifiers, explained above) are retrieved from the cloud database and a facial recognition engine is applied, comparing facial profile from the new photograph with all profiles of photographs of members of the proximity group to identify the correspondent. Identifying a correspondent from a small group is useful for identification accuracy. Since the proximity group may include a small number of people, facial recognition may provide significantly more accurate and fast identification, in contrast with a situation where facial recognition is applied to the whole affiliate database, which may potentially include thousands of company employees or participants of a major conference or a trade show.

In an embodiment, a size of a proximity group may be further reduced by comparing momentary proximity radiuses (with respect to coordinates of the active user) for all members of the proximity group with the estimated distance from the user to the correspondent at the time when the photo was taken, based on the photograph dimensions and characteristics of the device camera. After such comparison, members of the proximity group of the user who are unquestionably further from the user than a distance estimated from the photo may be excluded from the subsequent facial comparison.

In case of successful identification of a correspondent within a proximity group of the user based on the photograph, the cloud service may retrieve contact information of the correspondent, made available by the correspondent for a specific type of meeting identified by the system (see discussion of subscriber privacy notes, above), push the contact information back to a mobile device of the user, such as smartphone, enter the contact information of the correspondent into personal contact information of the user or into a content management system and display the information to the user on a smartphone, smart glasses or other wearable display. In case of an unsuccessful identification attempt for various reasons, such as an inadequate facial expression of the correspondent on the photograph, disabled system software on a mobile device of the correspondent or an absence of such device, etc., the system software application may warn the user by a visual or audio notification. Additionally, in some embodiments, the correspondent may be alerted that someone in proximity is requesting contact info of the correspondent and may release or deny such transfer of information.

The proposed system may significantly improve identification accuracy by narrowing down a list of candidates. The system may also simplify an identification ceremony, reducing manual portion of the process to a single click or touch used to take a photo of the correspondent. Additionally, the system may speed up the process of identification compared with a system where only personal identifiers are used and the system displays all available contacts in the proximity of a device of the user to allow a choice of the correspondent; the system may also eliminate user distraction associated with making a choice of potential candidates.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for accurate and time efficient identification of an individual and retrieving corresponding contact information based on facial recognition within a limited and dynamically updated proximity group.

Figure 1:
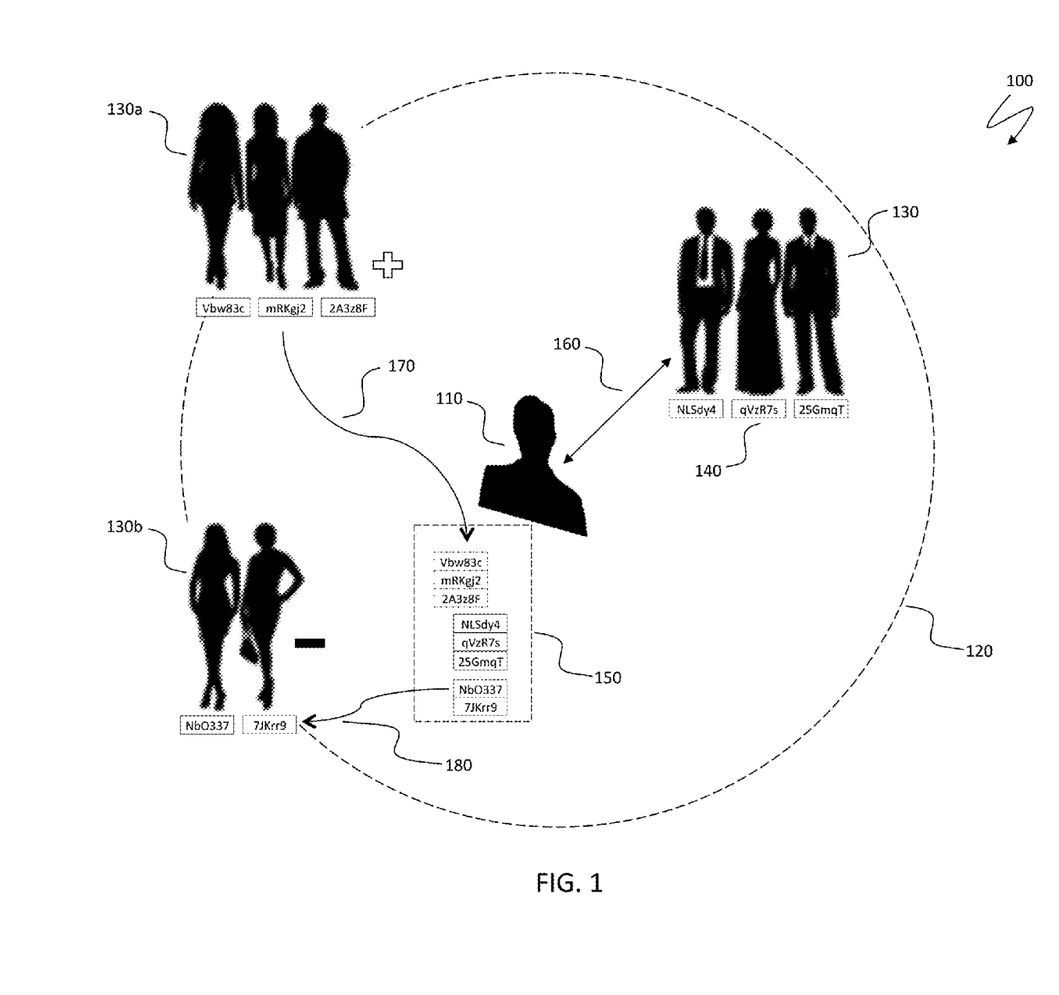
FIG. 1 is a schematic illustration of a dynamic user proximity group, according to an embodiment of the system described herein.

FIG. 1 is a schematic illustration 100 of a dynamic user proximity group. The system retrieves coordinates of a user 110 and tracks all subscribers of a cloud service associated with the system within a proximity area 120. Groups of service subscribers 130, 130a, 130b, with system software running on personal devices of the groups of service subscribers 130, 130a, 130b (affiliates), located within the proximity area 120 form a dynamic user proximity group, identified by the system. Personal identifiers 140 of affiliates are transferred to a dynamic list of identifiers 150 on mobile device(s) of users via a wireless handshake free protocol or may be stored in a cloud service, as explained elsewhere herein. In FIG. 1, the user looks at the group of service subscribers 130 of the dynamic user proximity group, as indicated by an arrow 160.

Simultaneously, another group of service subscribers 130a enters the proximity area 120, as shown by a white plus sign; personal identifiers of affiliates in the group of subscribers 130a are added to the dynamic list 150, as indicated by an arrow 170. The group of service subscribers 130b leaves the proximity area 120, as shown by a black minus sign; identifiers of the group of service subscribers 130b are deleted from the dynamic list 150, as indicated by an arrow 180.

Figure 2:
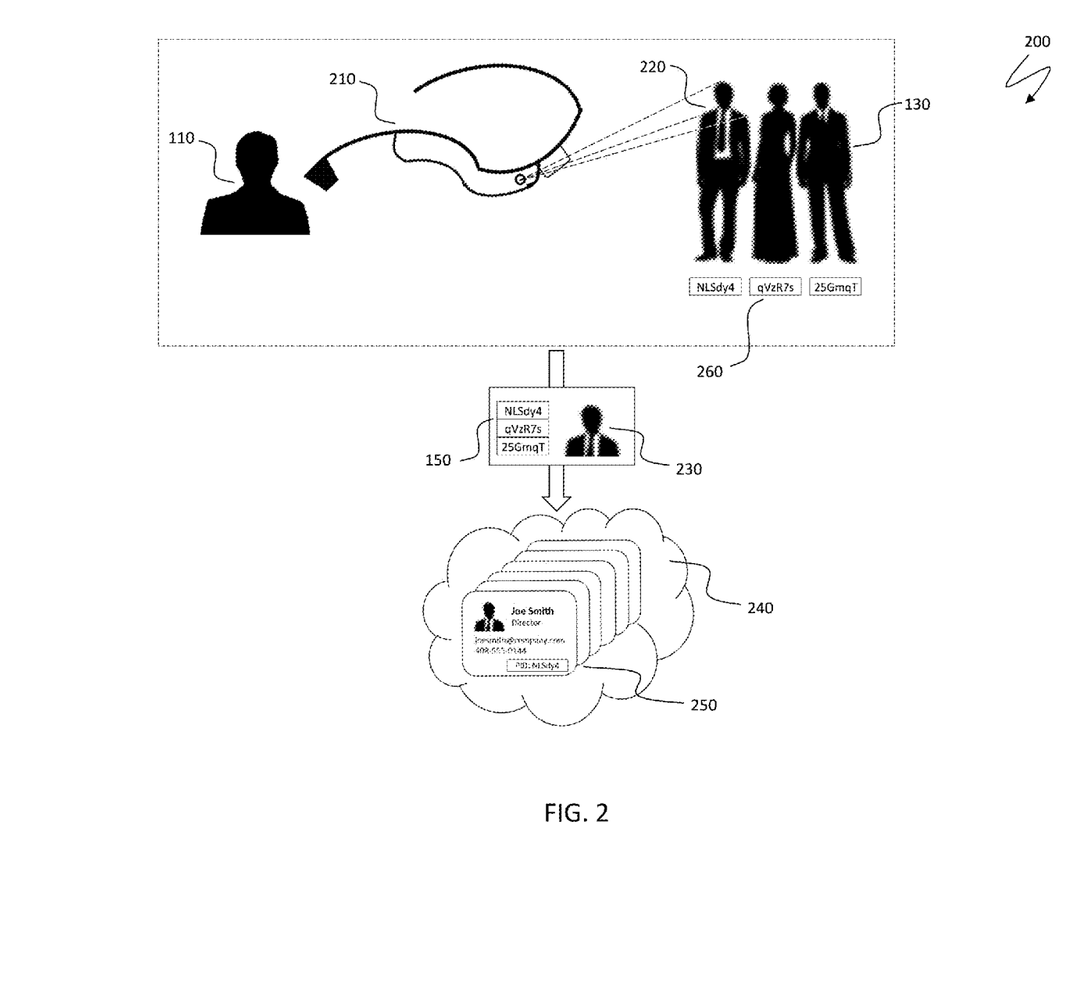
FIG. 2 schematically illustrates taking and transferring a photograph of a correspondent, according to an embodiment of the system described herein.

FIG. 2 is a schematic illustration 200 of taking and transferring of a photograph of a correspondent. A user 110 wearing smart glasses or other augmented reality device 210 desires to make introductions to an affiliate 220 from the group of service subscribers 130 of a dynamic proximity group and takes a photograph of the affiliate 220 using a built-in camera of the device 210. Note that, at the moment of photographing, personal identifiers 260 of affiliates in the group of service subscribers 130 are stored on a mobile device of the user 110, which may be the smart glasses 210, a smartphone or other device.

Subsequently, a photograph 230 and the dynamic list 150 of identifiers of the group of service subscribers 130 is uploaded to a cloud service 240 where contact information of the group of service subscribers 130 is stored in a cloud database 250. In an embodiment of the system illustrated in FIG. 2, only personal identifiers of affiliates in the group of service subscribers 130 are included in communications with the cloud service 240; other identifiers, such as identifiers belonging to affiliates within the group of service subscribers 130a shown in FIG. 1, are dropped from the list 150 after an analysis of the photograph and of distances between the user and all affiliates in the groups of service subscribers 130, 130a, 130b, as explained elsewhere herein.

Figure 3:
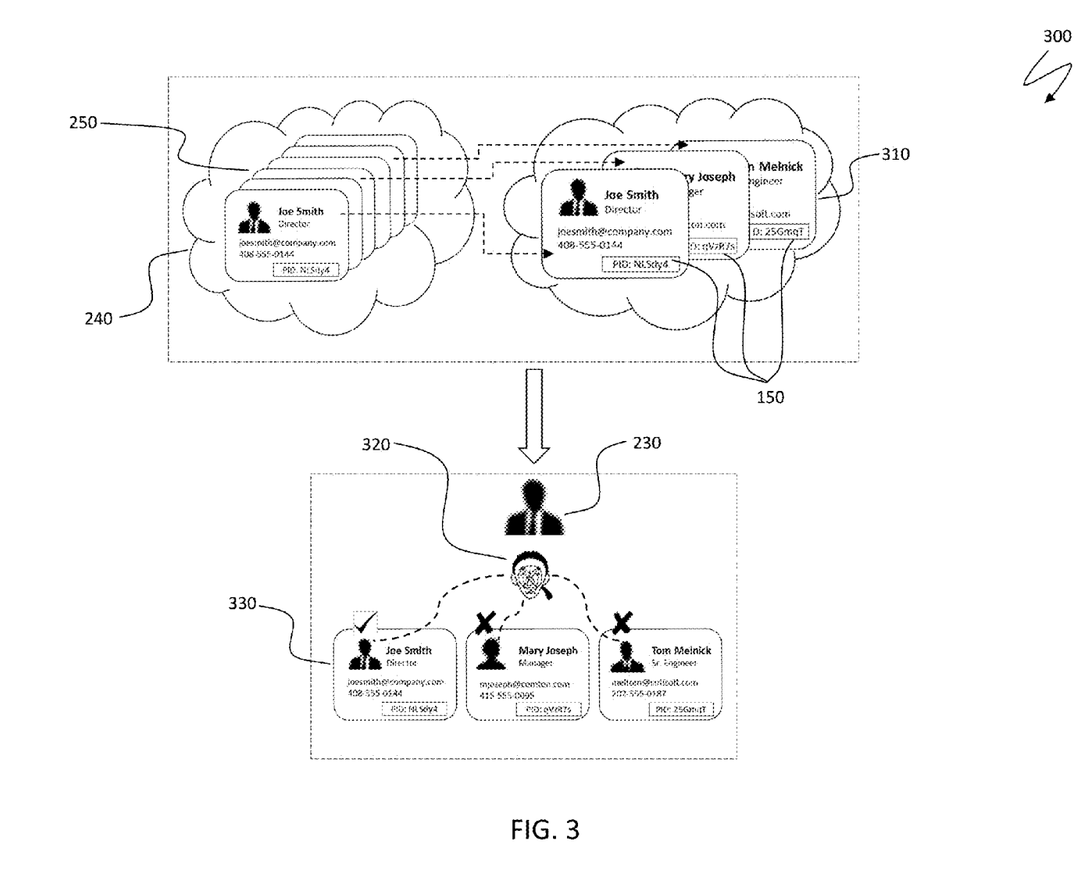
FIG. 3 is a schematic illustration of identification of a correspondent within a cloud service, according to an embodiment of the system described herein.

FIG. 3 is a schematic illustration 300 of identification of a correspondent within a cloud service. The cloud service 240 operates the database 250 of contact information of service subscribers. A dynamic list 150 of personal identifiers included in a user identification request along with a photograph 230 is instantly processed by the system, which retrieves a limited set of database records 310, associated with the received personal identifiers 150. The photograph 230 may be pre-processed to facilitate facial recognition. The set of records 310 is subsequently transferred to a facial recognition engine 320 where the records 310 are compared with the photograph 230 and best matching candidate(s) 330 are selected, as identified by rejection crosses and a checkmark near the records in FIG. 3.

Figure 4:
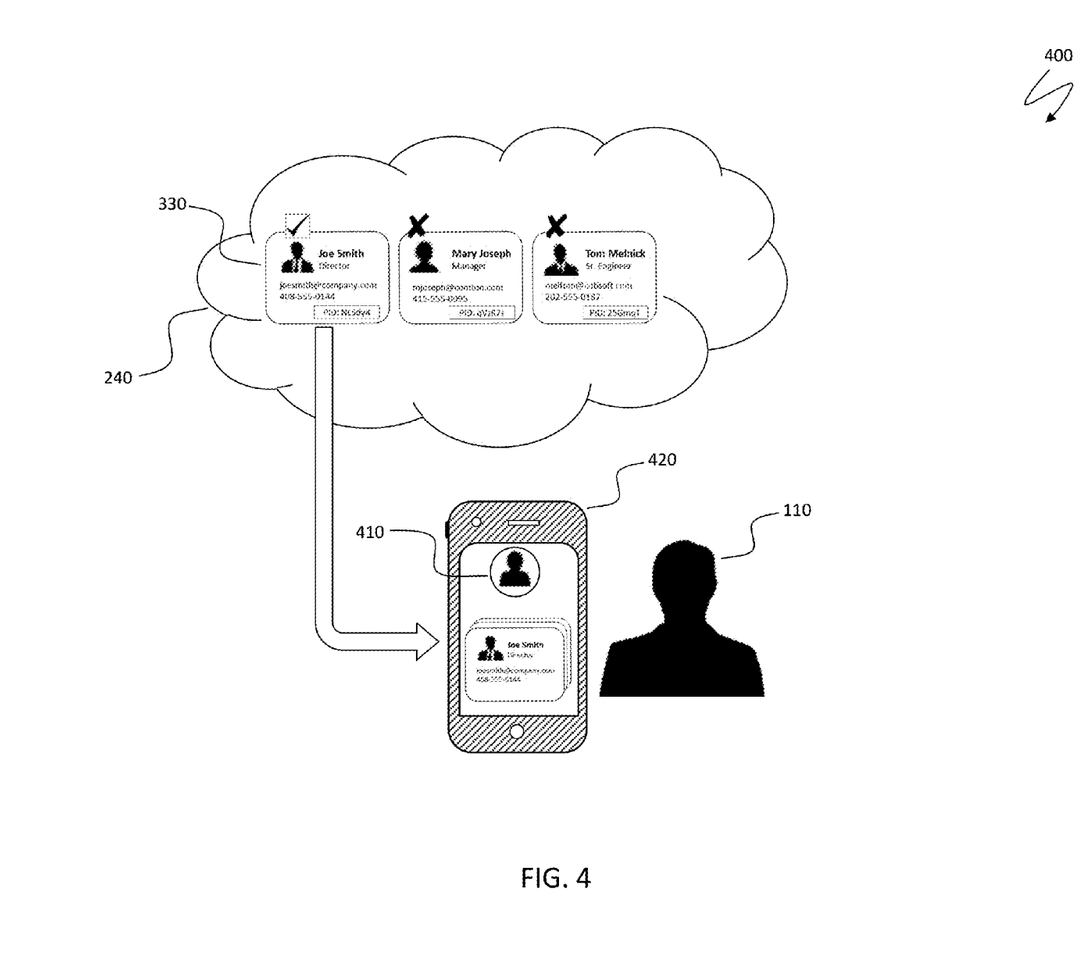
FIG. 4 is a schematic illustration of delivering contact information of a correspondent to a user, according to an embodiment of the system described herein.

FIG. 4 is a schematic illustration 400 of delivering contact information of a correspondent to a user. In the event of successful identification of the correspondent, the cloud service 240 may select appropriate contact information from among the candidates 330 (possibly subject to permission levels established by the correspondent, as explained elsewhere herein) and may transfer the contact information to a contact management application 410 running on a mobile device 420 of the user 110. Accordingly, the information may be transferred back for displaying on smart glass of a user or on other wearable augmented reality display, so that the user may instantly see the name of the correspondent following photographing the correspondent. In some embodiments, there may be several delays to the display of the contact information: (i) in a scenario where the correspondent is expected to confirm release of contact information in response to a request; (ii) in a situation where several affiliates from a dynamic proximity group have been identified and the system cannot make a final decision based on recognition scores, then photographs of all identified affiliates may be shown on the augmented reality display or a smartphone of the user to allow manual selection of the correspondent, followed by displaying permitted contact information of the correspondent.

Figure 5:
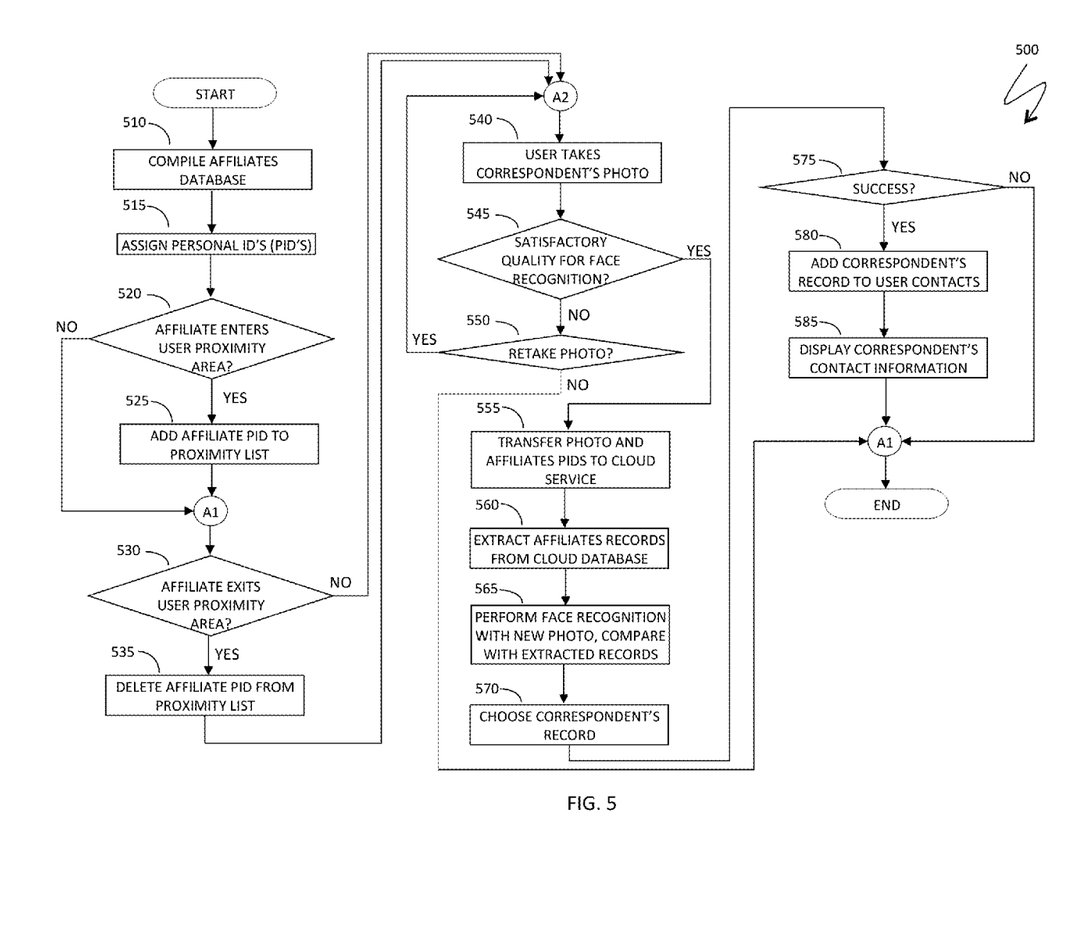
FIG. 5 is a system flow diagram illustrating system functioning, according to an embodiment of the system described herein.

Referring to FIG. 5, a flow diagram 500 illustrates processing performed in connection with functioning of the system described herein. Processing begins at a step 510 (an offline step) where the system compiles an affiliates database in a cloud service, as explained elsewhere herein. After the step 510, processing proceeds to a step 515 where personal IDs (PIDs) are assigned to affiliates, as explained above. After the step 515, processing proceeds to an inline test step 520 where it is determined whether a new affiliate entering a user proximity area has been detected. If so, processing proceeds to a step 525 where a PID of the new affiliate is added to the dynamic proximity list.

After the step 525, processing proceeds to a test step 530 where it is determined whether an affiliate who has been previously included on the dynamic proximity list is leaving the proximity area. Note that the test step 530 can also be reached directly from the test step 520 in the event when new affiliates entering the proximity area have not been identified. If so, processing proceeds to a step 535 where the PID of the affiliate that is leaving is deleted from the dynamic proximity list. After the step 535, processing proceeds to a step 540 where the user takes a photograph of a correspondent. Note that the step 540 can also be reached directly from the test step 530 in the event when previously included affiliates aren't leaving the proximity area. After the step 540, processing proceeds to a test step 545 where it is determined whether the photograph has a satisfactory quality for facial recognition, as explained elsewhere herein. If not, processing proceeds to a test step 550 where it is determined whether the user is willing to retake a photograph of the correspondent. If so, processing proceeds back to the step 540; otherwise, processing is complete.

If it is determined at the step 545 that photograph of the correspondent has a satisfactory quality, processing proceeds to a step 555 where the photograph and the dynamic list of PIDs from the user proximity group is transferred to the cloud service, as explained elsewhere herein, in particular, in conjunction with FIG. 2. After the step 555, processing proceeds to a step 560 where contact information records for affiliates included in the dynamic list are extracted from the cloud database. After the step 560, processing proceeds to a step 565 where the system performs facial recognition with the new photograph and compares the new photograph with photographs in extracted records. After the step 565, processing proceeds to a step 570 where the system chooses a record (or multiple records) based on the facial recognition results. After the step 570, processing proceeds to a test step 575 where it is determined whether the facial recognition was successful (for example, if a score corresponding to photograph matching is sufficient for reliable identification). If so, processing proceeds to a step 580; otherwise, processing is complete.

At the step 580, successful record(s) for one or more correspondents are added to user contacts. After the step 580, processing proceeds to a step 585 where contact information for the correspondent is displayed to the user to facilitate introductions or other activities. Note that a possible scenario when there are several candidate correspondents and the user needs to make an additional visual identification and choice of the final contact information is shown in FIG. 5. After the step 585, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, a tablet, a wearable device such as a smart glasses or a smart watch, a smart wearable display and/or camera or other type or wearable device; other devices, such as a laptop or desktop computer, are also possible. The mobile device may include software that is pre-loaded with the device, installed from an app store, installed from a desktop (after possibly being pre-loaded thereon), installed from media such as a CD, DVD, etc., and/or downloaded from a Web site. The mobile device may use an operating system selected from the group consisting of: the iOS operating system, the ANDROID operating system, the WINDOWS PHONE® operating system, the BLACKBERRY® operating system, and mobile versions of the LINUX® operating system. Mobile and other devices may be connected by various types of wireless and other connections, such as cellular connections in Wide Area Networks, WI-FI® wireless technology, BLUETOOTH® wireless technology, NFC, USB, infrared, ultrasound and other types of connections.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of accumulating contact information of a member of a set of participants, comprising:
    obtaining a facial image and contact information for each of the set of participants;
    obtaining from a client device of a user, a photograph of the member from the set of participants, the photograph including a facial image of the member;
    comparing the facial image of the member to the obtained facial images for a subset of the set of participants, the subset of participants determined to be within a proximity to the client device; and
    in response to matching the facial image of the member to the respective facial image of a particular participant in the subset of participants:
        determining a relationship between the user and the particular participant, including determining, for each respective group of a plurality of groups, whether the user and the particular participant are both members of the respective group; and
        sending a subset of the contact information of the particular participant to the user, wherein the subset of the contact information is selected based on the determined relationship.

2. A method, according to claim 1, wherein the client device is one of: smart glasses, a wearable camera, and a smart phone.

3. A method, according to claim 1, wherein a first group of the plurality of groups includes employees of affiliated organizations.

4. A method, according to claim 1, wherein a first group of the plurality of groups includes employees of an organization.

5. A method, according to claim 1, wherein a first group of the plurality of groups includes persons registered for a particular event.

6. A method, according to claim 1, wherein the obtained facial images of the set of participants are stored using a cloud service.

7. A method, according to claim 6, wherein the cloud service compares the facial image of the member to the obtained facial images of the set of participants.

8. A method, according to claim 1, wherein the comparing is initiated automatically in response to the user photographing the member.

9. A method, according to claim 1, further comprising:
    determining a distance between the user and the member based on analysis of the photograph; and
    determining a proximity radius for the user based on the determined distance;
    wherein the subset of the participants are within the determined proximity radius.

10. A method, according to claim 1, further comprising informing the member that contact information for the member has been shared.

11. A method, according to claim 1, wherein the particular participant determines whether to release the contact information of the particular participant.

12. A method, according to claim 1, wherein the particular participant determines an amount of the contact information of the particular participant to release.

13. A non-transitory computer-readable medium containing software, the software comprising:
    executable code that obtains a facial image and contact information for each of a set of participants;
    executable code that obtains from a client device of a user, a photograph of a member from the set of participants, the photograph including a facial image of the member;

executable code that compares the facial image of the member to the obtained facial images for a subset of the set of participants, the subset of participants determined to be within a proximity to the client device; and executable code that, in response to matching the facial image of the member to the respective facial image of a particular participant in the subset of participants:
- determines a relationship between the user and the particular participant, including determining, for each respective group of a plurality of groups, whether the user and the particular participant are both members of the respective group; and
- sends a subset of the contact information of the particular participant to the user, wherein the subset of the contact information is selected based on the determined relationship.

14. A non-transitory computer-readable medium, according to claim 13, wherein the client device is one of: smart glasses, a wearable camera, and a smart phone.

15. A non-transitory computer-readable medium, according to claim 13, wherein a first group of the plurality of groups includes employees of affiliated organizations.

16. A non-transitory computer-readable medium, according to claim 13, a first group of the plurality of groups includes employees of an organization.

17. A non-transitory computer-readable medium, according to claim 13, wherein a first group of the plurality of groups includes persons registered for a particular event.

18. A non-transitory computer-readable medium, according to claim 13, wherein the obtained facial images of the set of participants are stored using a cloud service.

19. A non-transitory computer-readable medium, according to claim 18, wherein the cloud service compares the facial image of the member to the obtained facial images of the set of participants.

20. A non-transitory computer-readable medium, according to claim 13, wherein the comparing is initiated automatically in response to the user photographing the member.

21. A non-transitory computer-readable medium, according to claim 13, further comprising executable code that:
- determines a distance between the user and the member based on analysis of the photograph; and
- determines a proximity radius for the user based on the determined distance;
- wherein the subset of the participants are within the determined proximity radius.

22. A non-transitory computer-readable medium, according to claim 13, further comprising executable code that informs the member that contact information for the member has been shared.

23. A non-transitory computer-readable medium, according to claim 13, wherein the particular participant determines whether to release the contact information of the particular participant.

24. A non-transitory computer-readable medium, according to claim 13, wherein the particular participant determines an amount of the contact information of the particular participant to release.

* * * * *